(12) United States Patent
Chu et al.

(10) Patent No.: US 8,802,000 B2
(45) Date of Patent: Aug. 12, 2014

(54) MICROPLATES WITH ULTRA-THIN WALLS BY TWO-STAGE FORMING

(75) Inventors: Daniel Y. Chu, Hercules, CA (US); Hui Du, San Ramon, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 600 days.

(21) Appl. No.: 12/511,839

(22) Filed: Jul. 29, 2009

(65) Prior Publication Data

US 2010/0028988 A1 Feb. 4, 2010

Related U.S. Application Data

(60) Provisional application No. 61/085,674, filed on Aug. 1, 2008.

(51) Int. Cl.
| | | |
|---|---|---|
| *B29C 51/10* | (2006.01) | |
| *B29C 51/04* | (2006.01) | |
| *B01L 3/00* | (2006.01) | |
| B29C 51/02 | (2006.01) | |
| B29K 23/00 | (2006.01) | |

(52) U.S. Cl.
CPC .............. *B29C 51/04* (2013.01); *B29C 51/02* (2013.01); *B01L 2200/12* (2013.01); *B01L 3/50851* (2013.01); *B01L 2300/0829* (2013.01); *B29K 2023/06* (2013.01); *B29C 2791/006* (2013.01); *B29K 2023/12* (2013.01)
USPC .......................... 264/547; 264/544; 264/571

(58) Field of Classification Search
USPC ................................................ 264/291, 526
See application file for complete search history.

(56) References Cited

U.S. PATENT DOCUMENTS

| | | | |
|---|---|---|---|
| RE28,063 E  * | 7/1974 | Scalora ......................... 264/532 |
| 4,323,341 A  * | 4/1982 | Valyi .............................. 425/526 |
| 6,319,456 B1 | 11/2001 | Gilbert et al. |
| 6,340,589 B1 | 1/2002 | Turner et al. |
| 6,556,940 B1 | 4/2003 | Tretiakov et al. |
| 6,849,225 B1 | 2/2005 | Gilbert et al. |
| 7,108,495 B2 | 9/2006 | Gilbert et al. |
| 2001/0051112 A1 | 12/2001 | Gulzow et al. |
| 2004/0214315 A1 | 10/2004 | Saluz et al. |
| 2007/0059219 A1 | 3/2007 | Turner |
| 2007/0212775 A1 | 9/2007 | Cohen et al. |

FOREIGN PATENT DOCUMENTS

| | | |
|---|---|---|
| EP | 1000661 A1 | 5/2000 |
| JP | 2001-017155 A1 | 1/2001 |

OTHER PUBLICATIONS

Office Action from JP Appl. No. 2011-521350, dated Aug. 15, 2013. English translation version only.

* cited by examiner

*Primary Examiner* — Monica Huson
(74) *Attorney, Agent, or Firm* — Kilpatrick Townsend & Stockton LLP

(57) ABSTRACT

A multi-well plate with wells having ultra-thin walls and yet with sufficient structural rigidity to allow reliable use of the plate in automated instrumentation is formed by first forming a plate blank by injection molding, the blank being of a thickness that provides the desired rigidity, and then subjecting the blank to vacuum forming to stretch designated areas in the blank to form wells or to extend wells already formed, the stretching resulting in a reduction in thickness of the molded resin at the walls of the wells only.

10 Claims, 7 Drawing Sheets

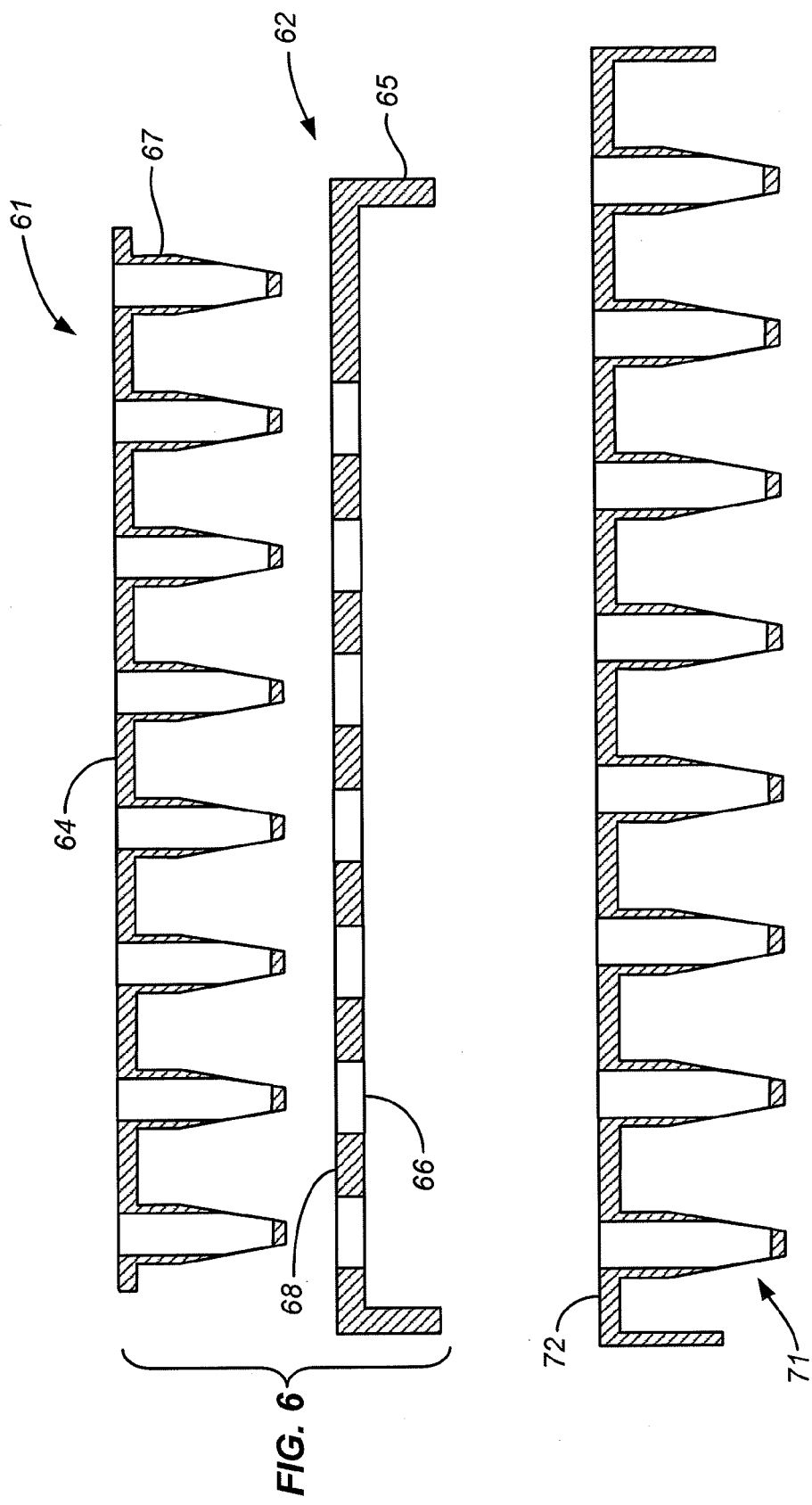

MICROPLATES WITH ULTRA-THIN WALLS BY TWO-STAGE FORMING

CROSS-REFERENCE TO RELATED APPLICATION

This application claims the benefit of U.S. Provisional Patent Application No. 61/085,674, filed Aug. 1, 2008, the contents of which are incorporated herein by reference.

BACKGROUND OF THE INVENTION

1. Field of the Invention

This invention relates to laboratory equipment used for performing sequential chemical reactions of which the polymerase chain reaction (PCR) is an example. In particular, this invention relates to the reaction vessels used in conjunction with thermal cyclers.

2. Description of the Prior Art

PCR is one of many examples of chemical processes that require precise temperature control of reaction mixtures with rapid and precise temperature changes between different stages of the process. PCR itself is a process for amplifying DNA, i.e., producing multiple copies of a DNA sequence from a single strand bearing the sequence. PCR is typically performed in instruments that provide reagent transfer, temperature control, and optical detection in a multitude of reaction vessels such as wells, tubes, or capillaries. The process includes a sequence of steps that are temperature-sensitive, different steps being performed at different temperatures in a sequence that is repeated a multitude of times to obtain a quantity large enough for analysis and study from a starting sample of extremely small volume.

While PCR can be performed in any reaction vessel, multi-well plates are the vessels of choice. In many applications, PCR is performed in "real-time" and the reaction mixtures are repeatedly analyzed throughout the process, using the detection of light from fluorescently-tagged species in the reaction medium as a means of analysis. In other applications, DNA is withdrawn from the medium for separate amplification and analysis. Multiple-sample PCR processes in which the process is performed concurrently in a number of samples offer significant advantages, including high efficiency in treating a large number of samples simultaneously and the ability to compare and combine results from different samples for a variety of analytical, diagnostic, and research purposes. Concurrent processing is achieved by using a multi-well plate with one sample per well. The entire plate including all samples therein is simultaneously equilibrated to a common thermal environment in each step of the process. Multi-well plates are particularly useful in automated PCR procedures. Plates with 96 wells in an 8×12 array are typical, but plates with up to 1536 wells are also used.

To perform temperature cycling, the plate is placed in contact with a metal block, known in the industry as a "thermal block," which is heated and cooled either by Peltier heating/cooling modules or by a closed-loop liquid heating/cooling system that circulates heat transfer fluid through channels machined into the block. The heating and cooling of the thermal block are typically under the control of a computer with input from the operator. The thermal block has a contour complementary to that of the plate wells to achieve full surface contact and hence intimate thermal contact and maximal heat transfer, between the block and each well.

The plate is typically of plastic formed by injection molding. Unfortunately, plastic is not a medium of high thermal conductivity and this causes the plate to present thermal resistance to heat transfer between the thermal block and the samples in each well. The plastic itself is thus a rate-limiting factor in the speed with which the temperature can be raised and lowered in the PCR process. The resistance of the plate to heat transfer can be lowered by reducing the plate thickness, but the typical injection molding process is limited in terms of how thin a plate can be formed thereby. Recognition of this limitation is found in Turner, United States Patent Application Publication No. US 2007/0059219 A1, publication date Mar. 15, 2007. The solution offered by Turner is the use of a two-stage molding process, the first stage involving injection of the resin into a mold cavity and the second involving moving the parts of the mold after it is closed to compress the resin and displace it within the closed cavity.

Plates that are formed with ultra-thin walls tend to have low rigidity, which leads to dimensional instability. In commercially viable PCR procedures, the plates and the samples that are retained in the plate wells must be manipulated by automation, and dimensional stability is required for reliable movement and positioning of the plates as well as the accurate movement of samples and reagents into and out of the individual wells. One solution is offered by Hans-Knöll Institut, European Patent Application Publication No. EP 1 000 551 A1, publication date May 17, 2005, and its counterpart, United States Patent Application Publication No. US 2004/0214315 A1, publication date Oct. 8, 2004. The plate in the Hans-Knöll Institut document is constructed with a rigid frame that surrounds the central area occupied by the wells and is joined to the central area by heat bonding. This design is of limited effect since the rigid frame occupies only the periphery of the plate, leaving the relatively large center section vulnerable to buckling. A further difficulty is that heat bonding is of limited reliability as a means of keeping the sections of the plate properly joined.

SUMMARY OF THE INVENTION

The present invention resides in a method of manufacturing multi-well plates that are sufficiently rigid to achieve dimensional stability and yet have wells with ultra-thin walls for maximal heat transfer. The invention also resides in the plates formed by the aforementioned method. In certain embodiments of the invention, the plate is a unitary structure formed from a single shot of resin by a succession of molding steps. In certain other embodiments, the plate is a composite plate that includes a multi-well plate with wells of ultra-thin walls and a supporting plate to further rigidify the remainder of the multi-well plate other than the wells. The method for forming the multi-well plate in all such embodiments includes injection molding followed by forming by way of a pressure differential, such as by vacuum forming, both steps performed on a single continuous mass of resin. The pressure differential forming can be concentrated on the sections of the plate that form the walls of the individual wells, allowing the remainder of the plate to retain a relatively rigid character produced by the injection molding. The rigidity can thereby extend to the planar horizontal areas between adjacent wells and to a peripheral rim or shoulder surrounding the well array for those plates that contain such a rim or shoulder. The pressure differential forming results in the stretching of sections of the injection-molded plate to form the thin walls of the well, and can be concentrated on portions of the walls of each well rather than on the entire well. In either case, the plate is provided with wells that have ultra-thin walls or wall segments. For example, wells can be formed in which the ultra-thin-walled portions of the wells are the lateral walls only and not the floors of the wells, or the lower parts of the lateral walls, leaving a thicker-walled neck or upper portion connecting the thin-walled lower portions to the deck.

The invention also resides in a novel multi-well plate that has a deck and an array of wells, each well having a neck portion adjacent to the deck, and a lower portion adjacent to the deck terminating in a well floor, in which the lower portion has an ultra-thin wall relative to the deck, neck, and floor. A deck of this configuration is formable from a single continuous mass of resin by injection molding followed by vacuum forming, as described above, but the plate prior to vacuum forming and the mold in which vacuum-forming is performed can be configured such that the elongation occurs only in the portion of each well between the neck and the floor. Finally, multi-well plates of different wall thicknesses can be formed by forming the injection molded plate with different thicknesses at different well locations, or by using an appropriately shaped vacuum-forming mold that will produce greater elongation in some wells than in others, or by both in combination.

The term "multi-well plates" is used herein to include any structure that has two or more wells joined to each other through connecting segments. These structures thus include strip tubes, i.e., strips with a single row of wells (or "tubes"), as well as plates with two-dimensional arrays of wells. Examples of strip tubes are those with eight tubes and those with twelve tubes; examples of plates with two-dimensional arrays are those with 48 wells in a 6×8 array, those with 96 wells in a 9×12 array, those with 384 wells in a 16×24 array, and those with still greater numbers of wells.

These and other features of the invention and of individual embodiments of the invention are described below.

BRIEF DESCRIPTION OF THE DRAWINGS

FIG. 6 is a cross section of a multi-well plate in accordance with the present invention in combination with a supporting or rigidifying component that includes a skirt and deck.

FIG. 7 is a cross section of another multi-well plate in accordance with the present invention, in which the skirt and deck are formed of more rigid material than the wells.

DETAILED DESCRIPTION OF THE INVENTION AND PREFERRED EMBODIMENTS

Figure 1:
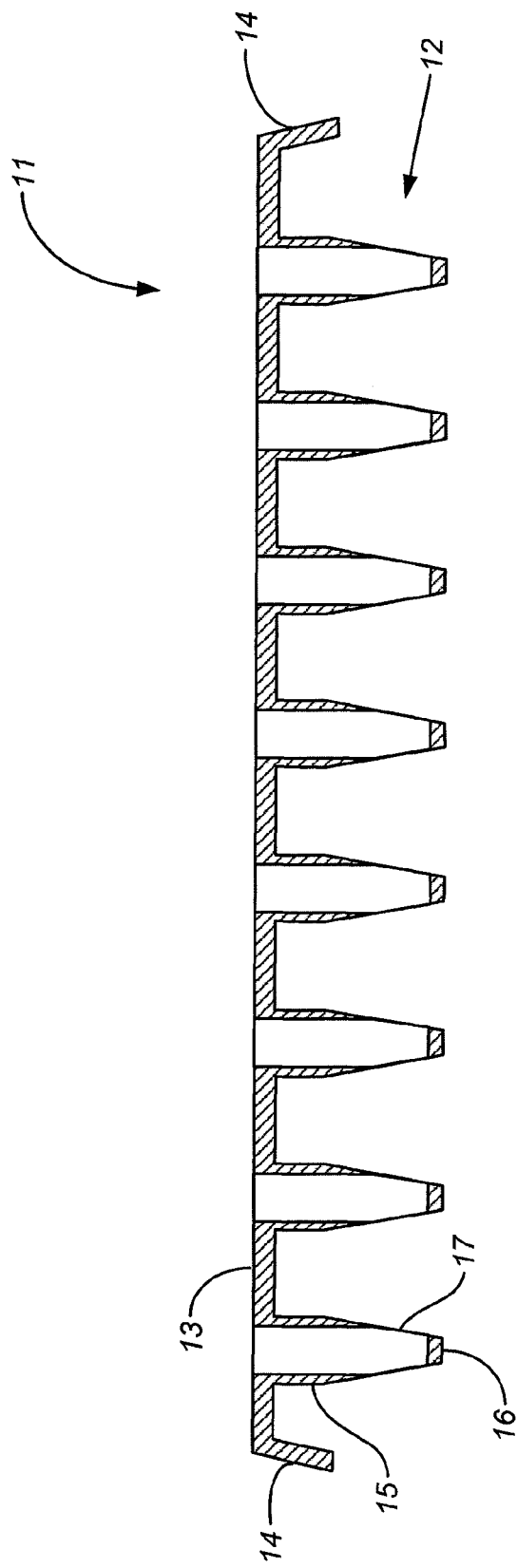
FIG. 1 is a cross section of an example of a multi-well plate in accordance with the present invention.

A variety of resins can be used for manufacturing multi-well plates in accordance with the present invention. Examples are polyolefins (including metallocene-catalyzed polyolefins), polyvinyl chloride, polycarbonate, polyesters and other thermoplastic materials. Resins that are the most compatible with the PCR reaction are the most preferred, and notable among these are polypropylene, including unoriented polypropylene, and polypropylene-polyethylene copolymer. The preliminary plate that is formed by injection molding but prior to pressure differential forming is referred to herein as the "molded part" and also as a "blank." The injection molding step is performed in a conventional two-part mold by injecting the resin in molten form into the closed mold and allowing the resin to cool and solidify within the mold to form the molded part. The temperature of the molten resin will be that which will allow the resin to flow inside the mold, and the optimal such temperature will vary with the choice of resin and will be known to those skilled in the art or readily determined by known methods. In most cases, this temperature will be within the range of about 70° C. to about 310° C. The thickness of the molded part is determined by the mold itself, and the minimal thickness will depend on the flowability of the resin within the mold cavity. In many cases, the molded part will be of uniform thickness; in other cases, the mold can be designed to produce a part with different thicknesses in different sections. For molded parts of uniform thickness, the optimal thickness will be the minimum thickness that will provide the desired degree of rigidity. For molded parts in which certain regions are thicker than others, the thicker regions may be those that retain their thickness through the vacuum forming step and serve to provide the finished product with the desired rigidity. In preferred embodiments, each segment or wall of the molded part will have a thickness within the range of about 0.025 mm to about 3 mm, and preferably about 0.1 mm to about 2 mm.

The molded part serves as the blank for the pressure differential forming and can be a flat plate or a plate with rudimentary (partially formed) wells at the locations of the wells ultimately sought in the finished product. In the case of a flat plate, the pressure differential forming step will then draw out sections of the plate from the wells, while in the case of a plate with rudimentary wells, the pressure differential forming will extend the depths of the rudimentary wells. In both cases, the pressure differential results in stretching of sections of the blank to produce full-sized wells whose walls are thinner than the unstretched sections of the blank. These unstretched sections can either be the flat portions of the plate connecting the wells, which portions are collectively referred to herein as the "deck," or portions of the walls of the wells themselves. The shapes of the rudimentary wells and of the mold in which pressure differential forming is performed will determine which regions of the blank will undergo stretching and thus be thinned.

The pressure differential forming step is preferably enhanced by heating the molded part to a temperature at or above the heat deflection temperature of the resin for the load that will be applied (i.e., for the pressure differential), but below the melting temperature of the resin. Heat deflection temperatures for given loads are known in the art for particular resins, and can also be determined by the standard technique designated as ASTM D 648 which uses loads of either 66 psi (0.46 MPa) or 264 psi (1.8 MPa). For molded polypropylene, for example, the average heat deflection temperature is approximately 100° C. for a load of 66 psi, and approximately 70° C. for a load of 264 psi. The optimal temperature for the pressure differential forming step will depend on the configuration of the forming equipment, taking into account the heat loss when the heated part is transferred from the heating area to the forming area of the apparatus. Pressure differential forming can be performed by vacuum forming, by blowing into a mold cavity, or by the application of a mechanical pressure, or by a two or more of these methods in succession. Mechanical pressure can be applied by pressing a male forming tool against the heated part, and is preferably performed in combination with vacuum forming as a preliminary step. Regardless of the pressure differential method used, the degree of stretching of the injection molded plastic material during pressure differential forming can vary, but in most cases the desired results will be achieved by lengthening the material in the sections being stretched by a factor within the range of about 2 to about 5, to achieve a wall thickness of from about 0.025 mm to about 0.17 mm (0.00098 inch to 0.0067 inch).

FIG. 1 illustrates an example of a novel multi-well plate that can be formed by the process of the invention. FIG. 1 is a vertical cross section of an 8×12 well plate 11 taken through one of the twelve rows to show the profiles of the eight wells 12 that constitute the row. The flat portion of the plate connecting the wells is the deck 13, and a skirt 14 extends around the periphery of the plate. The deck 13 and skirt 14, as well as upper portions (or necks) 15 of the well walls and the floors 16 of the wells, are relatively thick compared to the lower portions 17 of the well walls.

Figure 2A:
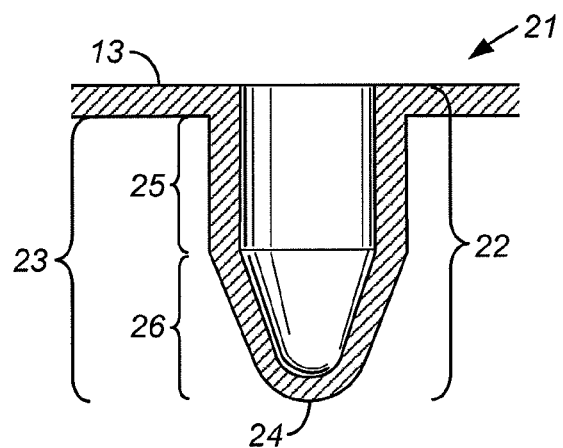
FIG. 2a is an enlarged cross section of a portion of the plate blank of FIG. 1, showing a single rudimentary well.
Figure 2B:
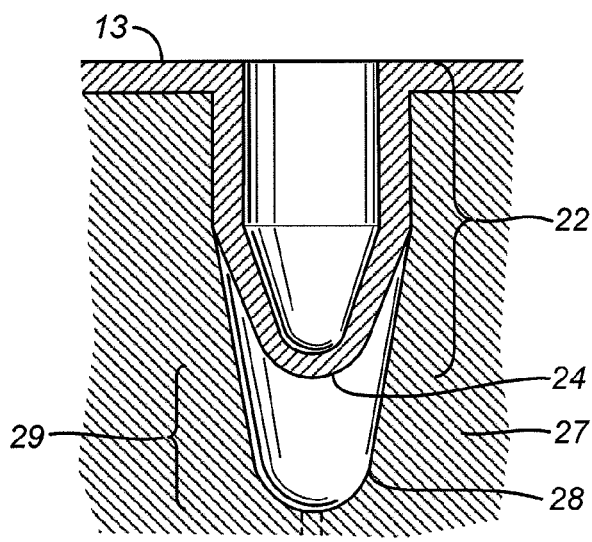
FIG. 2b is a view identical to that of FIG. 2a except with the plate blank positioned in a vacuum forming mold prior to vacuum forming.
Figure 2C:
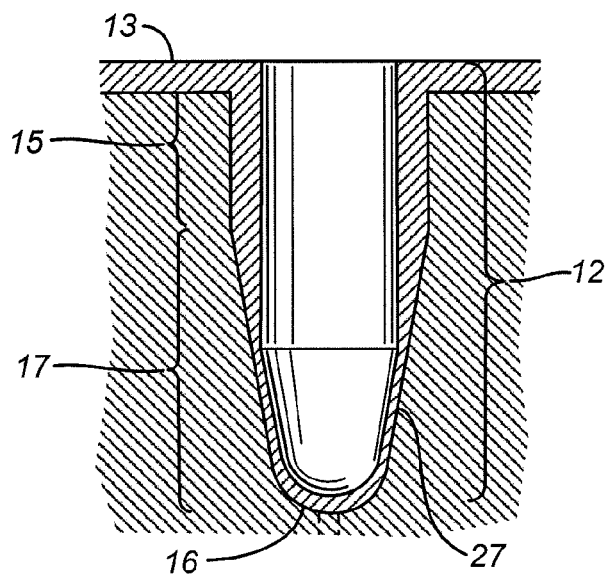
FIG. 2c is a view identical to that of FIGS. 2a and 2b showing the finished multi-well plate formed from the plate blank of the preceding figures at the completion of the vacuum forming stage.

One method in accordance with the invention for forming the plate of FIG. 1 is illustrated in FIGS. 2a, 2b, and 2c, each of which is an enlarged view, also in cross section, of a segment of the plate containing a single well. FIG. 2a shows the molded part or plate blank 21, which is formed from a single body of resin by single-shot injection molding. This plate blank includes the deck 13 and a rudimentary (partially formed) well 22 which includes lateral wall 23 and a floor 24, all of which are approximately of the same thickness. The lateral wall includes a straight cylindrical section or neck 25 and a lower section 26 of frustoconical shape between the neck 25 and the floor 24. Alternatively, the deck and the rudimentary well can have thicknesses different from each other, or there may be differences in thickness between different areas on the well wall, or between different wells. All thicknesses in this molded part however will be greater than the reduced thickness achieved by the subsequent forming step, which in this case utilizes vacuum only.

FIG. 2b shows the blank 21 in position in a vacuum forming mold 27 prior to the application of the vacuum. The mold 27 has a depression 28 or mold cavity aligned with each well 22 of the blank 21. The depression 28 and the well 22 are complementary in shape except that the depression 28 is deeper with a lower portion 29 extending beneath the floor 24 of the well of the molded part. Vacuum is applied in this lower portion 29 while the vacuum mold and the blank are heated, thereby drawing the softened resin of the blank into the lower portion, and stretching the portions of the resin that are not in contact with the mold wall. The result is shown in FIG. 2c, where the well 12 of the finished plate fills the entire depression 28 of the vacuum forming mold. The upper portion 15 of the well is substantially unchanged from the straight cylindrical lateral wall 25 of the blank, while the lower portion 17 has a considerably thinner (ultra-thin) wall. Depending on the mold configuration, the ultra-thin wall is either limited to the lower portion of the well as shown, or it can extend the entire height of the well. The floor 16, which has not undergone the same degree of stretching as the lateral wall of the lower portion 17, is approximately the same thickness as the upper portion 15 and thus thicker than the ultra-thin section formed from the lower portion 17.

Figure 3A:
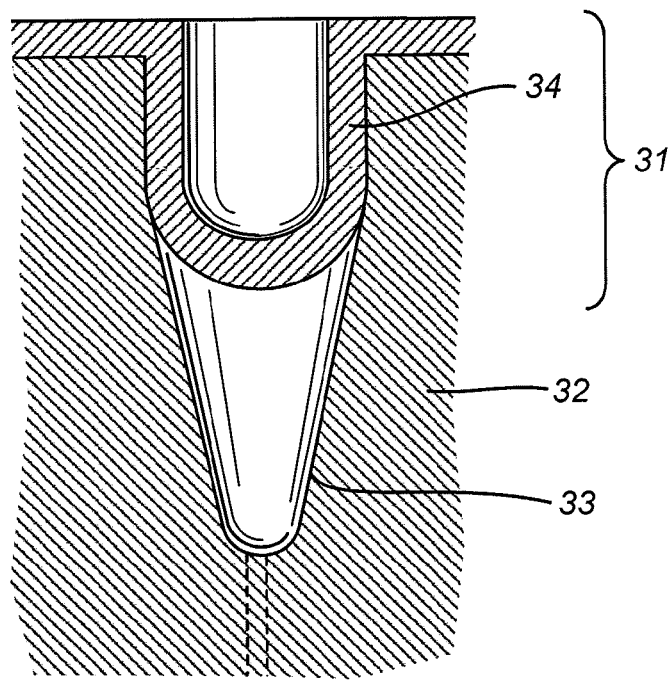
FIG. 3a is an enlarged cross section of a portion of an alternative plate blank, showing a single rudimentary well, in a vacuum forming mold prior to any forming in the mold.
Figure 3B:
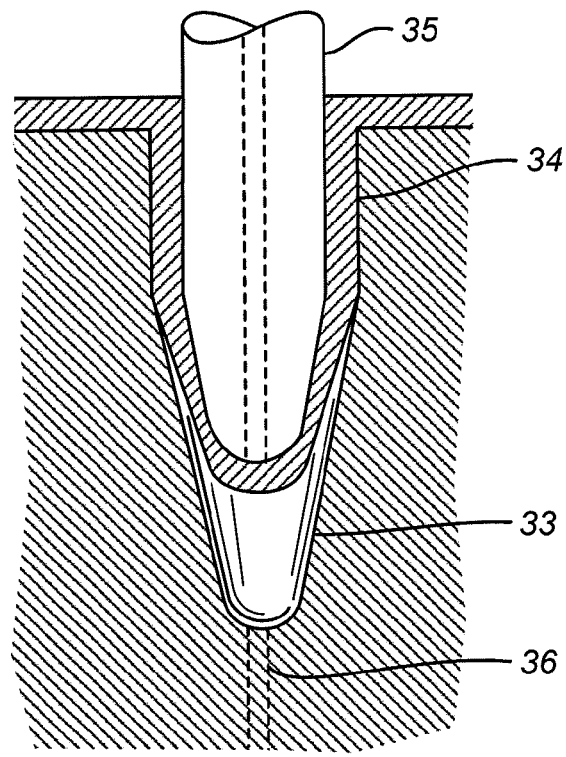
FIG. 3b is a view identical to that of FIG. 3a except with a plug mechanically pressed into the rudimentary well to partially extend the well.
Figure 3C:
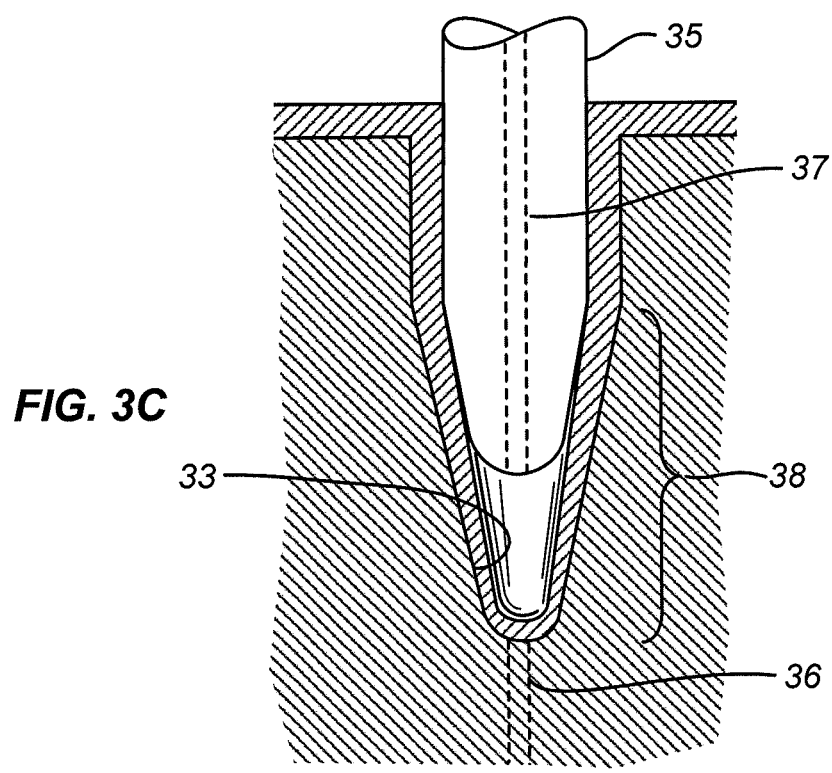
FIG. 3c is a view identical to that of FIGS. 3a and 3b after vacuum forming has been applied to complete the extension of the well and the reduction of its wall thickness.

FIGS. 3a, 3b, and 3c illustrate an alternative method, still within the scope of the invention, for forming the plate of FIG. 1 or a plate with analogous features. The plate blank 31 has been formed by injection molding in the same manner as the plate blank 21 of FIG. 2a, and can be identical to the plate blank 21 or different. In this case, the plate blank 31 is slightly different in shape, and is shown in position in the vacuum forming mold 32 immediately after placement in the mold and prior to any forming beyond its initial injection molding. As in FIGS. 2b, and 2c, the vacuum forming mold 32 in FIG. 3a has a depression 33 or mold cavity that is deeper than the rudimentary well 34 of the plate blank, leaving room for the rudimentary well 34 to expand. FIG. 3b illustrates an intermediate expansion stage, in which a plug 35 is inserted into the rudimentary well 34 and pressed down, preferably while the plug is heated, to deepen the rudimentary well to a partially extended state and to reduce the wall thickness of the well accordingly. The plug 35 thus imposes a pressure differential on the well walls by applying a positive pressure on the interior of the well. Air is allowed to escape the mold cavity 33 through a vent hole 36 in the mold. Preferably, an array of plugs is used, one for each well, so that all wells of the plate can be extended in this manner simultaneously. Vacuum forming is then performed in FIG. 3c with the vent hole 36 in the mold now serving as a vacuum conduit and without moving the plug 35 further. A vent hole 37 extending through the plug 35 allows the pressure above the well to remain at an ambient level as vacuum forming takes place. The vacuum forming extends the lower portion 38 of the well to fill the cavity, lengthening the well wall and reducing its thickness further.

Figure 4:
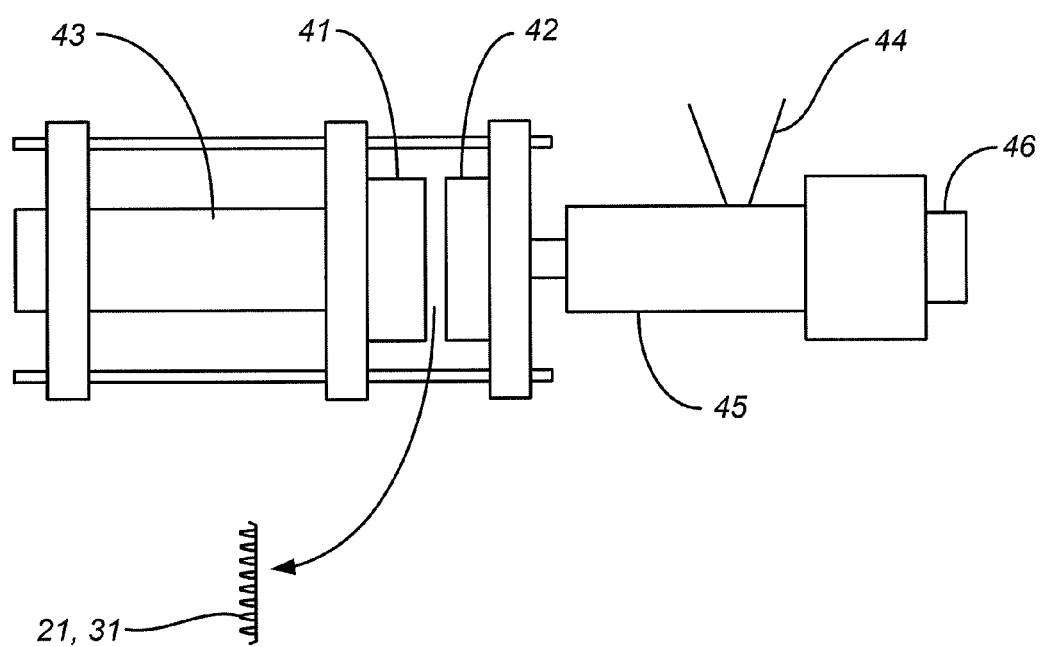
FIG. 4 is a diagram of an injection molding apparatus for forming the plate blank of FIG. 1.

FIG. 4 is a diagrammatical representation of a typical injection molding apparatus that can be used to form the plate blanks 21, 31 of FIGS. 2a and 2b. At the core of the apparatus are two mold halves 41, 42, one of which 41 is movable by a hydraulic cylinder and piston 43. Resin is supplied to the mold halves from a hopper 44 through an injection cylinder 45 which is typically a single-screw extruder whose rotation is driven by a hydraulic motor 46.

Figure 5:
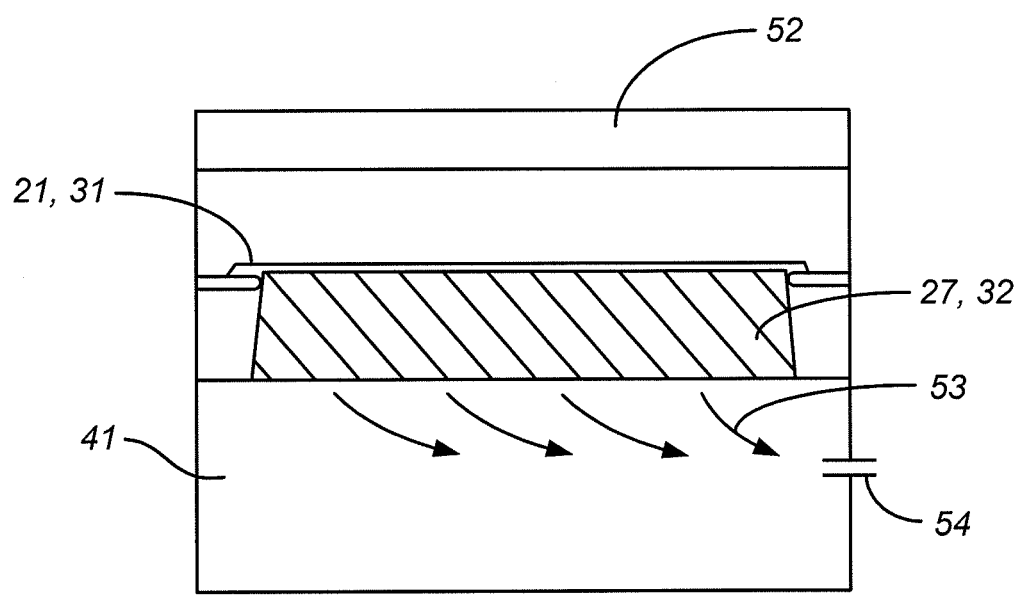
FIG. 5 is a diagram of a vacuum forming apparatus for performing the vacuum forming operation depicted in FIGS. 2a, 2b, and 2c.

FIG. 5 is as diagrammatical representation of a typical vacuum forming apparatus that can be used to stretch the wells of the plate blanks 21, 31 to form the final plates with the thin-walled wells. The apparatus includes a vacuum chamber 51 with one of the vacuum forming molds 27, 32 of FIGS. 2b and 3b, respectively, supported inside the chamber, and a heating element 52 positioned above the mold. The plate blank is placed on the mold and vacuum is drawn through the mold in the directions indicated by the arrows 53 through a vacuum conduit 54, thereby producing the final thin-walled multi-well plate.

An alternative to the multi-well plate shown in FIG. 1 but still within the scope of the present invention, is shown in FIG. 6. To obtain a greater contrast between thin well walls and an otherwise rigid plate, the multi-well plate 61 in this embodiment of the invention is used in combination with a separate skirt and deck member 62, the two parts 61, 62 being shown in exploded form in the Figure. The skirt and deck member 62 is formed with substantially more rigid material than that of the well plate 61. For example, the skirt and deck member 62 can be formed of polycarbonate and the multi-well plate formed of polypropylene. The skirt 65 in this embodiment is part of the skirt and deck member 62 rather than part of the well plate 61. The skirt and deck member 62 has an array of openings 66 that are aligned with, and of slightly greater diameter than, the wells 67 of the well plate, so that the wells will pass through the openings while the flat connecting segments 64 of the well plate rest on the deck 68 of the deck and skirt member 62. Alternatively, the rudimentary wells, i.e., the wells before expansion by vacuum forming, or by the pressure from a plug followed by vacuum forming, can be injection molded directly over the deck and skirt member 62, thereby eliminating the flat connecting segments 64 of relatively flexible material between the wells. Vacuum forming, or plug forming followed by vacuum forming, can then be performed on the resulting composite structure. An example of a multi-well plate formed in this manner is shown in FIG. 7, where individual wells 71 or a relatively soft resin such as polypropylene are molded over an apertured plate 72 or a more rigid resin such as polycarbonate to form a single composite molded structure, and the wells are then stretched by vacuum forming to achieve the form shown. While the details of the rim surrounding each well where the well is joined to the plate are not shown, the rim preferably extends above the surface of the plate and in some cases, below the surface of the plate as well.

In the claims appended hereto, the term "a" or "an" is intended to mean "one or more." The term "comprise" and variations thereof such as "comprises" and "comprising," when preceding the recitation of a step or an element, are intended to mean that the addition of further steps or elements is optional and not excluded. All patents, patent applications, and other published reference materials cited in this specification are hereby incorporated herein by reference in their entirety. Any discrepancy between any reference material cited herein or any prior art in general and an explicit teaching of this specification is intended to be resolved in favor of the teaching in this specification. This includes any discrepancy between an art-understood definition of a word or phrase and a definition explicitly provided in this specification of the same word or phrase.

What is claimed is:

1. A process for forming a multi-well plate with thin-walled wells, said process comprising:
    (a) forming a plate blank from a plastic resin by injection molding, said plate blank having an initial thickness and comprised of a deck portion and an array of rudimentary wells, each rudimentary well comprising an upper lateral wall section and a lower lateral wall section;
    (b) placing the plate blank so formed in a vacuum forming mold, the vacuum forming mold comprising an array of depressions aligned with the rudimentary wells, each depression configured to accommodate one rudimentary well, wherein each depression is complementary in shape to the upper lateral wall section of a rudimentary well and comprises
        a lower portion that extends below the lower lateral wall section of a rudimentary well accommodated in the depression, and
        a vent hole in the lower portion; and
    (c) with the plate blank so placed, applying a pressure differential across the lower lateral wall sections of the rudimentary wells, thereby drawing resin of the lower lateral wall sections into the lower portions of the depressions, to selectively stretch and reduce the thickness of said lower lateral wall sections while leaving said deck portion and upper lateral wall sections unstretched and substantially thicker than said lower lateral wall sections.

2. The process of claim 1 wherein step (c) comprises pressing plugs into said plate blank to partially stretch said lower lateral wall sections, followed by vacuum forming to further stretch said lower lateral wall sections.

3. The process of claim 1 wherein step (c) comprises lengthening said lower lateral wall sections by a factor of about 2 to about 5.

4. The process of claim 1 wherein said plastic resin is a member selected from the group consisting of polypropylene and polypropylene-polyethylene copolymer.

5. The process of claim 1, wherein step (a) comprises injection molding said rudimentary wells over a pre-formed apertured plate of material that is more rigid plastic than said plastic resin of said rudimentary wells.

6. The process of claim 1, wherein step (c) comprises heating the plate blank to a temperature above the heat deflection temperature but below the melting temperature of the resin.

7. The process of claim 1, wherein the lower lateral wall sections have a final thickness of from about 0.025 mm to about 0.17 mm.

8. The process of claim 2, wherein air escapes through the vent hole when pressing the plugs into the plate blank, and a vacuum is drawn through the vent hole for vacuum forming.

9. The process of claim 1, wherein each rudimentary well further comprises a floor, the lower portion of each depression further extends below the floor of a rudimentary well accommodated in the depression, and applying the pressure differential leaves the floor substantially thicker than the lower lateral wall sections.

10. The process of claim 1, wherein the initial thickness of the plate blank is a uniform thickness.

* * * * *